United States Patent [19]

Kanatani et al.

[11] 4,231,353
[45] Nov. 4, 1980

[54] SOLAR HEAT COLLECTING APPARATUS

[75] Inventors: Keiichi Kanatani, Kirakata; Masato Osumi, Osaka; Hajime Hayama, Nara, all of Japan

[73] Assignee: Sanyo Electric Co., Ltd., Moriguchi, Japan

[21] Appl. No.: 904,412

[22] Filed: May 10, 1978

[30] Foreign Application Priority Data

May 13, 1977 [JP] Japan ............................. 52-62380[U]
Jun. 20, 1977 [JP] Japan ............................. 52-81370[U]

[51] Int. Cl.³ .............................................. F24J 3/02
[52] U.S. Cl. .................................. 126/443; 126/442
[58] Field of Search ............... 126/270, 271, 443, 442, 126/438, 451; 174/82; 65/36

[56] References Cited

U.S. PATENT DOCUMENTS

| | | | |
|---|---|---|---|
| 1,068,650 | 7/1913 | Harrison | 126/271 |
| 2,889,952 | 6/1959 | Claypoole | 65/36 X |
| 4,119,085 | 10/1978 | Knowles et al. | 126/271 |
| 4,133,298 | 1/1979 | Hayama | 126/271 |

*Primary Examiner*—James C. Yeung
*Assistant Examiner*—Larry Jones
*Attorney, Agent, or Firm*—Darby & Darby

[57] ABSTRACT

A solar heat collecting apparatus which comprises a cylindrical outer member through which solar heat energy may be penetrated, a cylindrical inner member capable of absorbing solar heat energy disposed in said outer member, the inside of said inner member being formed as a passage for a heating medium, and end plates through which the end portions of said inner member are hermetically projected and for hermetically closing the open ends of said outer member, said end plates being provided at the peripheries thereof with annular grooves to be charged with bonding material, said annular grooves having the outer peripheral walls lower than the inner peripheral walls thereof to prevent said bonding material from flowing from the annular grooves toward the centers of said end plates over the inner peripheral walls, thereby to prevent the occurrence of cracks in the solidified bonding material and to subsequently prevent the break of a vacuum formed in the inside of said outer member, whereby the apparatus is improved in reliability and life-time.

8 Claims, 8 Drawing Figures

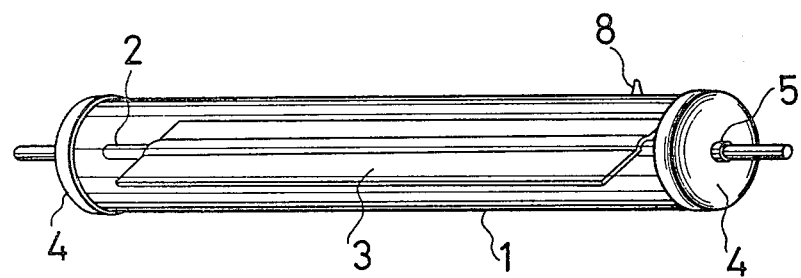
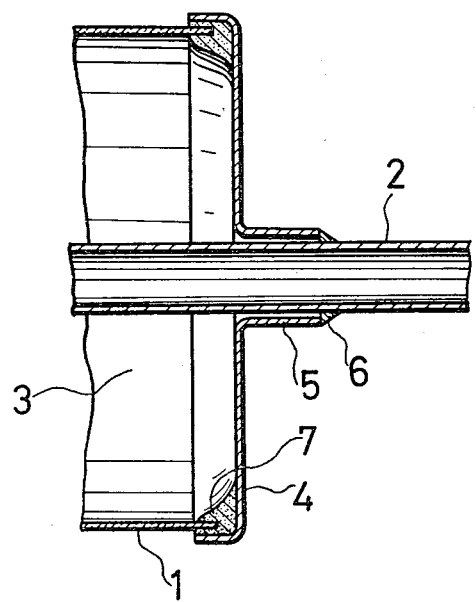

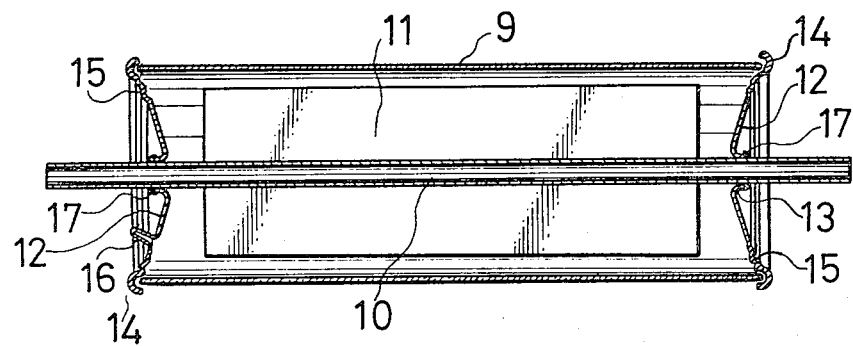

4,231,353

SOLAR HEAT COLLECTING APPARATUS

BACKGROUND OF THE INVENTION

As shown in FIGS. 1 and 2, conventional solar heat collecting apparatus for absorbing solar heat energy have been made as described below.

A heat collecting fin 3 attached to a cylindrical inner member 2 is mounted in a cylindrical outer member 1 through which solar heat energy may be penetrated. The cylindrical inner member 2 may absorb solar heat energy and the inside thereof is formed as a passage for a heating medium. Then, the end portions of the inner member 2 are inserted into supports 5 disposed at metallic end plates 4, and the tips of the supports 5 are hermetically sealed to the inner member 2 by silver solder 6. The open ends of the outer member 1 are then joined to the hook-shape peripheries of the end plates 4 by bonding material 7. From an exhaust tubulure 8 disposed at the peripheral surface of the outer member 1, the inside of the outer member 1 is then exhausted and evacuated for efficiently insulating and for preventing the occurrence of dew condensation on the inner surface of the outer member 1.

However, in accordance with such a conventional solar heat collecting apparatus, when joining the open ends of the outer member 1 to the peripheries of the end plates 4, the hook-shape peripheries of the end plates 4 may permit the outflow of the bonding material 7 thereby to secure the quantity of bonding material with difficulty, thus resulting in ineffective workability and increased manufacturing cost.

Furthermore, due to difference in thermal contractility between the outer member 1 and the inner member 2, the end plates 4 are bent and subsequently cracks will take place in the bonding material 7 securely solidified on the surfaces of the end plates 4, thus impairing the airtightness provided in the inside of the outer member 1.

There has been another type solar heat collecting apparatus in which the end plates for hermetically closing the open ends of the cylindrical outer member are provided at the peripheries thereof with annular grooves to be charged with bonding material. However, the conventional apparatus of this kind has been formed such that the outer peripheral walls of the annular grooves are higher than the inner peripheral walls. Accordingly, when the open ends of the outer member are inserted into the annular grooves charged with bonding material, the surplus bonding material flows from the annular grooves toward the center portions of the end plates over the inner peripheral walls of the annular grooves. On the other hand, the end plates have generally been made of metallic material and have had resiliency, but the bonding material used as melted has then solidified and had no resiliency. Accordingly, when the inner member were expanded and contracted by heat or if any shocks were exerted to the end plates during the transportation, the installation or the handling of the solar heat collecting apparatus, the end plates have been deformed. At the time of such deformation, cracks have often easily taken place in the bonding material flowed from the annular grooves toward the centers of the end plates over the annular groove inner peripheral walls, because the bonding material layers were thin. If such cracks have once taken place even though they are small, the cracks have caused the bonding material in the annular grooves also to be cracked whereby the vacuum formed in the outer member is easily broken.

It is an object of the present invention to provide a solar heat collecting apparatus in which an annular groove adapted to be charged with bonding material is formed at the periphery of each of the end plates for hermetically closing the open ends of the cylindrical outer member through which solar heat energy may be penetrated, and the outer peripheral walls of the annular grooves are formed as lower than the inner peripheral walls thereof, so as to prevent the bonding material from flowing from the annular grooves toward the centers of the end plates over the annular groove inner peripheral walls, thereby to prevent the occurrence of cracks in the solidified bonding material and subsequently prevent the break of the vacuum formed in the inside of said outer member, whereby the apparatus may be improved in reliability and life-time.

It is another object of the present invention to provide a solar heat collecting apparatus in which a contractible portion is formed at each of the end plates, so as to absorb the thermal expansion and contraction of the inner member serving as a passage of a heating medium, and to prevent the occurrence of cracks in the solidified bonding material, thereby to subsequently prevent the break of the airtightness provided in the outer member and therefore the rupture of the outer member itself.

BRIEF DESCRIPTION OF THE DRAWINGS

Embodiments of the present invention will further be described, by way of example, when taken in conjunction with the accompanying drawings, in which:

FIG. 1 is a perspective view of a conventional solar heat collecting apparatus;

FIG. 2 is an enlarged sectional view of main portions in FIG. 1;

FIG. 3 is a sectional view of a first embodiment of a solar heat collecting apparatus in accordance with the present invention;

Figure 4:
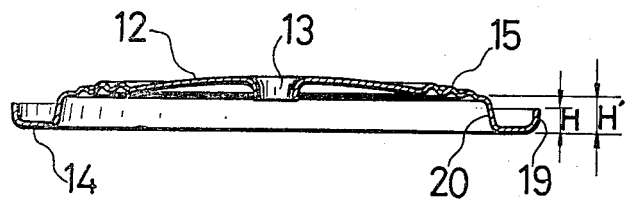
Figure 5:
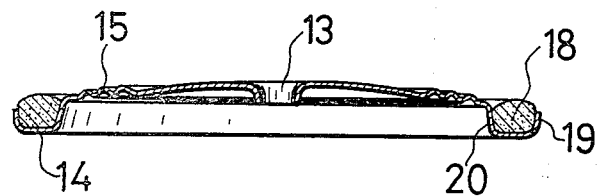
Figure 6:
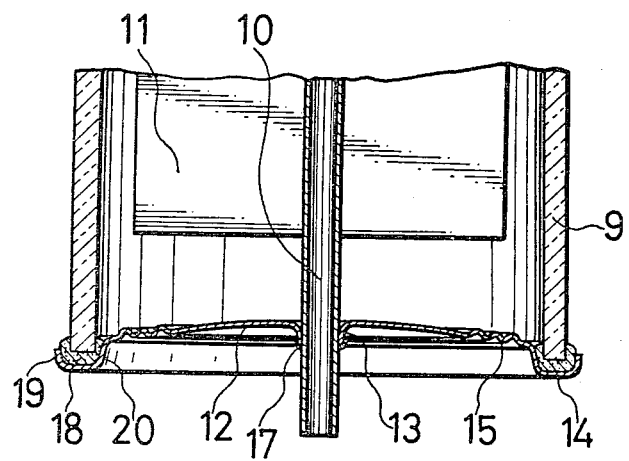

Each of FIGS. 4 to 6 is a sectional view, showing a joining process of an outer member to an end plate in the solar heat collecting apparatus in FIG. 3.

Figure 7:
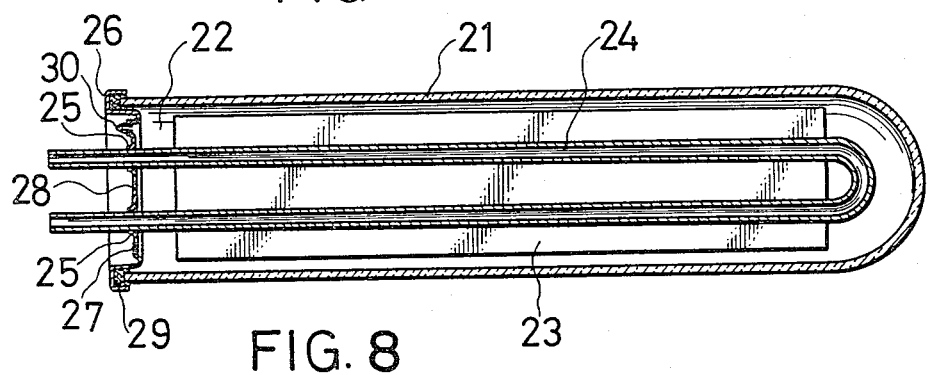
Figure 8:
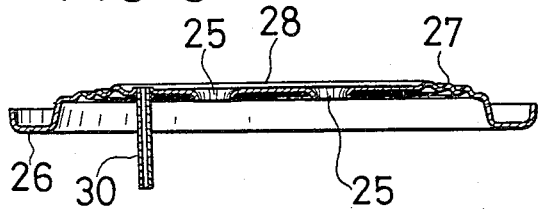

FIG. 7 is a sectional view of a second embodiment of a solar heat collecting apparatus in accordance with the present invention; and FIG. 8 is a sectional view of the end plate used in the solar heat collecting apparatus in FIG. 7.

DETAILED DESCRIPTION OF THE INVENTION

Referring now to FIGS. 3 to 6, the description will be made of a first embodiment of a solar heat collecting apparatus in accordance with the present invention.

A cylindrical outer member 9 having open ends may be made of transparent soda glass or the like, through which solar heat energy may be penetrated. A cylindrical inner member 10 made of, for example, copper or copper alloy may absorb solar heat energy and is disposed co-axially with the outer member 9 therein, and the inside of this inner member 10 is formed as a passage for a heating medium such as water, ethylene glycol or the like.

A heat collecting fin 11 is thermally contacted to the inner member 10. Metallic end plates 12 are disposed between each of the open ends of the outer member 9 and the inner member 10, and may be made of material, such as a Ni-Cr-Fe alloy, which has a thermal expansion coefficient approximately equal to that of the outer member 9 and is able to be joined to the outer member 9.

Cylindrical support 13 is projected from the center of each of the end plates 12 and formed integrally therewith. An annular convexed groove 14 is formed at the periphery of each of the end plates 12. An annular expandable portion 15 is provided at the inner part with respect to and adjacent to the annular groove 14.

An exhaust tubulure 16 made of metal, for example, copper is disposed at least at one of the end plates 12, but may also be disposed at both of the end plates 12.

The tip of the support 13 is hermetically sealed to the inner member 10 by solder material 17 such as silver solder. The open ends of the outer member 9 are joined to the peripheries of the end plates 12 by bonding material 18 such as powder plumbic oxide glass charged into the annular grooves 14.

The height H of an outer peripheral wall 19 of the annular groove 14 is formed as lower than the height H' of an inner peripheral wall 20. An expandable portion 15 is located at a position higher than the upper edge of the outer peripheral wall 19.

The description will then be made of a manufacturing process of said first embodiment.

The inner member 10 to which the heat collecting fin 11 is attached, is mounted in the outer member 9, and is inserted into the support 13 of one end plate 12. The tip of the support 13 is hermetically sealed to the inner member 10 by solder material 17. After charging the annular groove 14 of said one end plate 12 with bonding material 18, one open end of the outer member 9 is inserted to the annular groove 14 of said one end plate 12 and embedded in the bonding material. At this time, a surplus portion of the bonding material 18 all flows outside from the outer peripheral walls 19, because the outer peripheral walls 19 of the annular grooves 14 are formed as lower than the inner peripheral walls 20; namely the surplus portion of the bonding material 18 never flows toward the center portions of the end plates 12 over the inner peripheral walls 20. The inner member 10 is then inserted into the other end plate 12, and the other end plate 12 is subsequently joined to the other open end of the outer member 9 by bonding material 19 in the same manner as above. Thereafter, the inner member 10 and the tips of the supports 13 of the end plates 12 are hermetically sealed to each other by solder material 17.

The exhaust tubulure 16 is then connected to a vacuum pump, and the inside of the outer member 9 is exhausted and evacuated, and inert gas may be enclosed therein as necessary. Thereafter, the exhaust tubulure 16 is hermetically closed at its appropriate portion so as to maintain the inside of the outer member 9 airtight.

In accordance with the first embodiment of the solar heat collecting apparatus, an annular groove 14 adapted to be charged with bonding material 18 is formed at each of the peripheries of the metallic end plates 12 for hermetically closing the open ends of the cylindrical outer member 9, and the height H of each outer peripheral wall 19 of this annular groove 14 is formed as lower than the height H' of each inner peripheral wall 20, so that, when the open ends of the outer member 9 are inserted into and embedded in the bonding material 18 charged in the annular grooves 14, a surplus portion of the bonding material 18 flows only outside from the outer peripheral walls 19 and does not flow toward the center portions of the end plates 12 over the inner peripheral walls 20 of the annular grooves 14. Accordingly, even though the end plates 12 are deformed when the inner member 10 is thermally expanded and contracted or if any shocks are exerted to the end plates 12 during the transportation, the installation or the handling of the solar heat collecting apparatus, cracks will not occur in thus deformed portions of the end plates 12, beause there is no solidified bonding material attached to such deformed portions, so that the vacuum formed in the outer member 9 may not be broken, thereby improving the durability, life-time, and reliability of the apparatus.

Furthermore, in accordance with the present invention, an annular expandable portion 15 is formed at each of the end plates 12 at a position adjacent to and inside with respect to each annular groove 14. Accordingly, when the end plates 12 are deformed at the time the inner member 10 is thermally expanded and contracted or if any shocks are exerted to the end plates 12 during the handling of the apparatus, the stress due to such deformation may well be absorbed by these expandable portions 15 and subsequently never be exerted to the bonding material 18 solidified in the annular grooves 14, so that any cracks won't take place in the solidified bonding material 18.

It is further to be noted that in the present invention, powder plumbic oxide glass is used as the bonding material 18, soda glass as the outer member 9 and a Ni-Cr-Fe alloy as the end plates 12.

Referring now to FIGS. 7 and 8, description will be made of a second embodiment of the solar heat collecting apparatus in accordance with the present invention.

In this second embodiment, there is used a cylindrical outer member 21 having one closed end and one open end, through which solar heat energy may be penetrated. Inserted into the open end 22 of the outer member 21 is a U-shaped cylindrical inner member 24, to which a heat collecting fin 23 is attached and which may absorb solar heat energy. The open end 22 of the outer member 21 is sealingly closed by a metallic end plate 28, which is provided with an expandable portion 27, an annular groove 26 and supports 25 on which both ends of the inner member 24 are hermetically projected. In FIG. 7, bonding material and an exhaust tubulure are generally designated by 29 and 30, respectively.

Similarly to the first embodiment, the outer peripheral wall of the annular groove 26 is formed also as lower than the inner peripheral wall in this second embodiment, and its operational effect is identical as that in the first embodiment.

We claim:

1. A solar heat collecting apparatus comprising:
   a tubular outer member having at least one open end through which solar heat energy can penetrate,
   an end plate at each said open end for hermetically sealing each of the open ends of said outer member to provide a vacuum within the interior of said outer member, at least a portion of each end plate disposed inwardly of its periphery being resilient,
   a tubular inner member capable of absorbing solar heat energy disposed in said outer member, the ends of said inner member hermetically projecting from said end plates, the interior of said inner member acting as a passage for a heating medium, and
   an annular groove formed at the periphery of each of said end plates, defined by opposed inner and outer peripheral walls, each of said open ends of said outer member hermetically joined within an annular groove of a respective end plate by means of an initially flowable sealing substance within said groove, the height of said outer peripheral wall being lower than the height of the inner peripheral wall, the sealing substance extending no higher than said outer pheripheral wall and being always below the level of said inner peripheral wall.

2. A solar heat collecting apparatus according to claim 1 further comprising an annular expandable portion formed on each of said end plates adjacent to and interior of each of said annular grooves.

3. A solar heat collecting apparatus according to claim 1 further comprising means for hermetically bonding each of said open ends of said outer members to a respective said annular groove.

4. A solar heat collecting apparatus according to claim 3 wherein said bonding means comprises powder plumbic oxide glass joining each of said open ends of said outer member within a respective said annular groove, the excess of said glass overflowing said outer peripheral wall of said annular groove.

5. A solar heat collecting apparatus according to claim 1, wherein said outer member comprises soda glass.

6. A solar heat collecting apparatus according to claim 1 wherein each of said end plates comprises a metallic end plate.

7. A solar heat collecting apparatus according to claim 6 wherein each of said end plates comprises a Ni-Cr-Fe alloy.

8. A solar heat collecting apparatus according to claim 1 wherein each of said inner and outer members comprises a hollow cylindrical member.

* * * * *